(12) United States Patent
Tanabe et al.

(10) Patent No.: US 9,598,064 B2
(45) Date of Patent: Mar. 21, 2017

(54) BRAKE DRIVE CONTROL DEVICE PROVIDED WITH ABNORMALITY DETECTION FUNCTION

(71) Applicant: FANUC Corporation, Yamanashi (JP)

(72) Inventors: Yoshikiyo Tanabe, Yamanashi (JP); Yoshiki Hashimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 30 days.

(21) Appl. No.: 14/699,041

(22) Filed: Apr. 29, 2015

(65) Prior Publication Data

US 2015/0316111 A1    Nov. 5, 2015

(30) Foreign Application Priority Data

Apr. 30, 2014  (JP) .................. 2014-093677

(51) Int. Cl.
| | | |
|---|---|---|
| *F16D 65/14* | (2006.01) | |
| *B60T 13/74* | (2006.01) | |
| *B60T 17/18* | (2006.01) | |
| *F16D 63/00* | (2006.01) | |
| *H02P 15/00* | (2006.01) | |
| *F16D 121/20* | (2012.01) | |

(52) U.S. Cl.
CPC ............ *B60T 13/748* (2013.01); *B60T 17/18* (2013.01); *F16D 63/002* (2013.01); *F16D 65/14* (2013.01); *H02P 15/00* (2013.01); *H02P 29/0241* (2016.02); *F16D 2121/20* (2013.01)

(58) Field of Classification Search
CPC ..... B25J 19/0004; B25J 19/06; G05B 19/048; G05B 19/406; G05B 9/02; G05B 2219/50198; H01H 2231/04; H01H 47/002; B60T 13/748; B60T 17/18; F16D 63/002; F16D 65/14; G16D 2121/20; H02P 15/00; H02P 29/024
USPC ...................... 700/245; 901/49; 318/563, 565
See application file for complete search history.

(56) References Cited

U.S. PATENT DOCUMENTS

2015/0053514 A1*  2/2015  Unsin ................. B66D 5/14
                                                       188/161

FOREIGN PATENT DOCUMENTS

| | | |
|---|---|---|
| DE | 102013010406 A1 | 1/2014 |
| DE | 102013109597 A1 | 3/2014 |
| JP | 2006-123118 A | 5/2006 |
| JP | 2009-196031 A | 9/2009 |
| JP | 2014-10546 A | 1/2014 |
| JP | 2014-50912 A | 3/2014 |

* cited by examiner

*Primary Examiner* — Khoi Tran
*Assistant Examiner* — Robert Nguyen
(74) *Attorney, Agent, or Firm* — Hauptman Ham, LLP

(57) ABSTRACT

A brake drive control circuit of a servo motor which detects malfunction of a semiconductor circuit at the brake drive control circuit, that is, a brake drive control circuit which connects two semiconductor circuits in series to a brake and uses a voltage detection circuit which detects the presence of voltage which is applied to the brake by brake signals turning the semiconductor circuits on/off so as to detect test pulses in the voltage which is applied to the brake due to test pulses which are included in the brake signals and turn the semiconductor circuits off for instants during an operation for disengaging the brake and detect malfunctions of the semiconductor circuits by the detection of the test pulses.

7 Claims, 11 Drawing Sheets

NORMAL OPERATION

OPERATION AT TIME OF MALFUNCTION

TEST PERIOD 1

TEST PERIOD 2

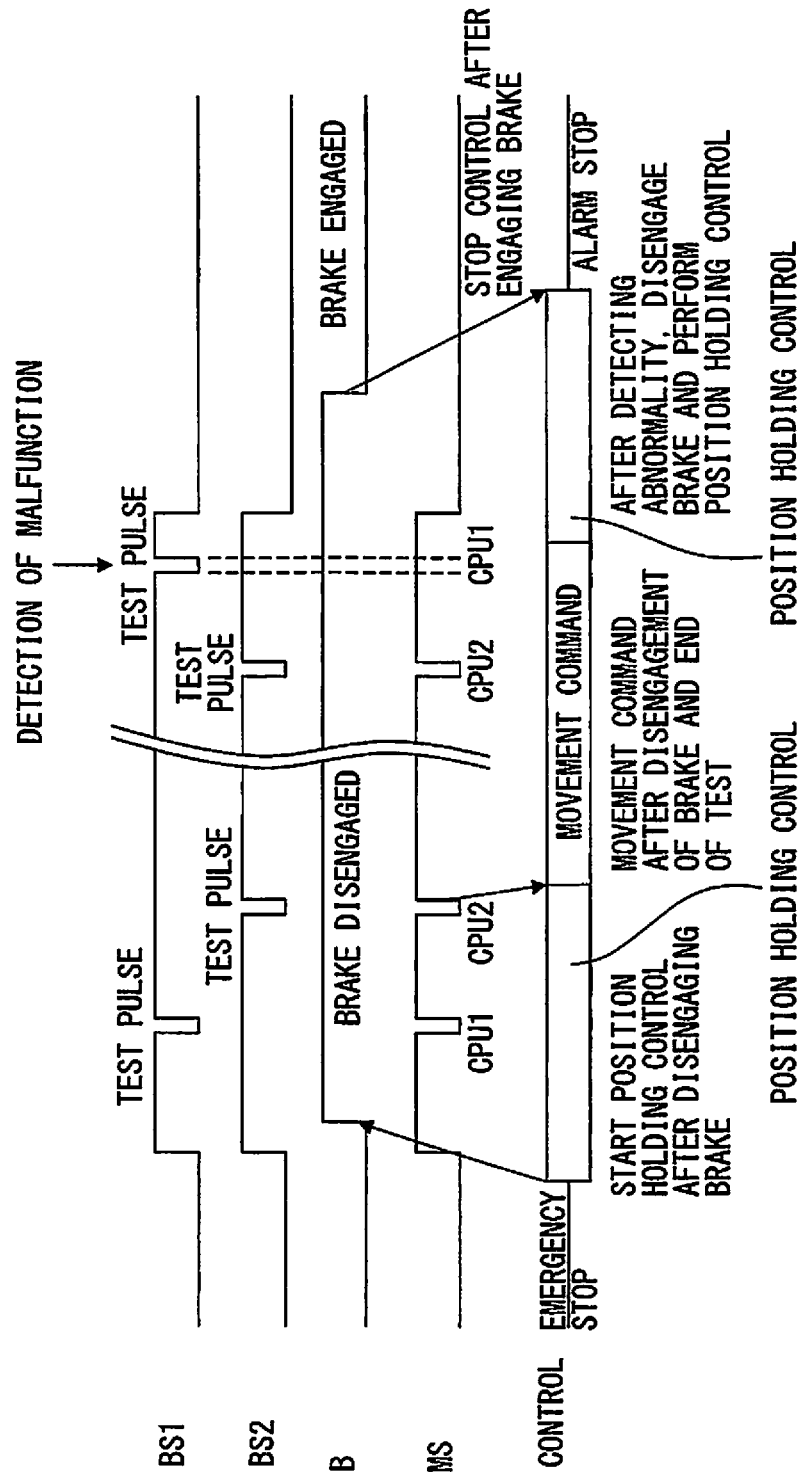

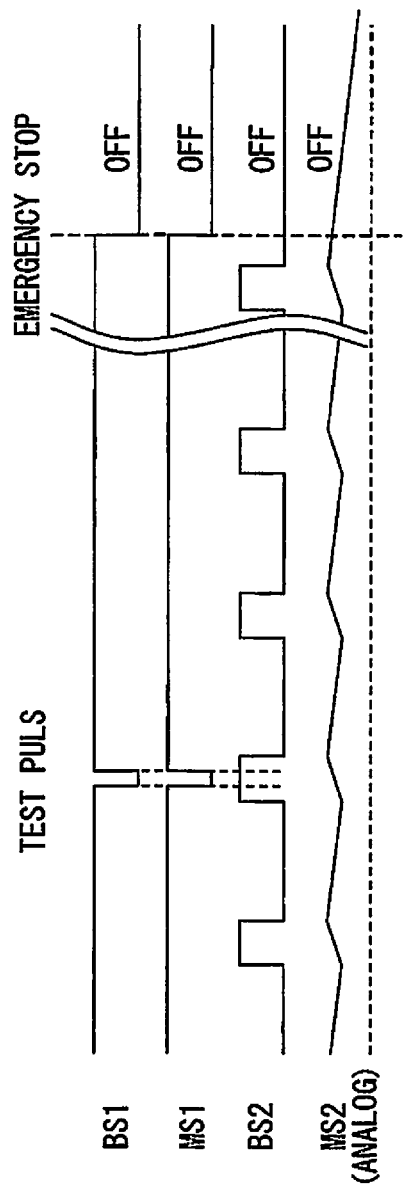

BRAKE DRIVE CONTROL DEVICE PROVIDED WITH ABNORMALITY DETECTION FUNCTION

RELATED APPLICATIONS

The present application claims priority to Japanese Application Number 2014-093677, filed Apr. 30, 2014, the disclosure of which is hereby incorporated by reference herein in its entirety.

BACKGROUND OF THE INVENTION

1. Field of the Invention

The present invention relates to a brake control device which is provided with an abnormality detection function which enables a brake abnormality to be detected even during robot operation.

2. Description of the Related Art

The servo motors which control the axes of a robot are equipped with electromagnetic brakes. The electromagnetic brakes hold the posture of the robot during an emergency stop of the servo motors, so are used for shortening the stopping distance when the servo motors make an emergency stop.

In recent years, to reduce the energy consumption of the robot, the robot controller has to deliberately engage the electromagnetic brakes so as to eliminate the power for maintaining the posture of the robot even when a robot temporarily stops during operation.

When electromagnetic brakes are engaged/disengaged while the robot temporarily stops during operation in this way, the number of times the electromagnetic brakes are engaged/disengaged greatly increases. If forming the brake drive control circuit by relays or other contact circuits, the brake drive control circuit will immediately end up reaching the end of its service life. For this reason, to realize high frequency operation such as engagement/disengagement of the electromagnetic brakes even when a robot is temporarily stopped, the brake drive control circuit has to be formed by semiconductor circuit.

However, a semiconductor circuit is liable to malfunction due to temporary overvoltage or short-circuiting etc. or is liable to malfunction due to short-circuiting of output due to incidental defects in parts. Further, if the output short-circuits, the brake ends up being disengaged (brake is rendered nonoperating) while the robot is in emergency stop condition. It becomes impossible to hold the posture of the robot and becomes extremely dangerous. For this reason, it is absolutely necessary to detect single fault of the brake circuit and to have the brake operate normally even at the time of malfunction.

In view of this, Japanese Patent Publication No. 2006-123118A discloses a brake drive control circuit 10 such as shown in FIG. 1A which can detect a semiconductor malfunction of a brake circuit. The brake drive control circuit 10 which is disclosed in Japanese Patent Publication No. 2006-123118A is formed by provision of two semiconductor switching devices Tr1 and Tr2, a brake B to which a surge absorber SA is connected in parallel, and a detection circuit D. The two semiconductor switching devices Tr1 and Tr2 are connected in series through the detection circuit D between the power supply and the ground (0V). The contact points C1 and C2 between the two semiconductor switching devices Tr1 and Tr2 of the detection circuit D are connected to the two ends of the brake B. The two semiconductor switching devices Tr1 and Tr2 turn on when the brake signals BS1 and BS2 are input. Further, the detection circuit D is for example comprised of a photo coupler and outputs a detection signal DS when voltage is applied to the brake B.

FIG. 1B shows the operation of the detection circuit D when the two semiconductor switching devices Tr1 and Tr2 are normal. In the test period, a high level brake signal BS1 or BS2 is input to just one of the two semiconductor switching devices Tr1 and Tr2. At this time, the other semiconductor switching device is turned off, so current does not flow to the detection circuit D and the detection circuit D does not output a detection signal DS. Further, when disengaging the brake (described in figure as "BRAKE DISENGAGED"), high level brake signals BS1 and BS2 are input simultaneously to the two semiconductor switching devices Tr1 and Tr2. At this time, the two semiconductor switching devices Tr1 and Tr2 are both turned on, so current flows to the detection circuit D and a high level detection signal DS is output from the detection circuit D.

FIG. 1C shows the operation of the detection circuit D at the time of an abnormality at one of the two semiconductor switching devices Tr1 and Tr2 such as short-circuiting of the switching device Tr1. When, in the test period, a brake signal BS1 is input to only the semiconductor switching device Tr1, the semiconductor switching device Tr2 is normally off, so current does not flow to the detection circuit D. The detection signal DS is not output from the detection circuit D. On the other hand, when the brake signal BS2 is input only to the semiconductor switching device Tr2, if the semiconductor switching device Tr1 is normal, it is off, so current does not flow to the detection circuit D, but if the semiconductor switching device Tr1 is abnormal, current ends up flowing to the detection circuit D.

Due to this configuration, when one of the two semiconductor switching devices Tr1 and Tr2 is malfunctioning and short-circuits, during the test period, current flows to the detection circuit D, so an alarm can be issued to report abnormalities of the semiconductor switching devices Tr1 and Tr2 and cut power to the brake drive control circuit 10. If cutting power to the brake drive control circuit 10, current no longer flows to the brake B and the brake B operates. In this way, in the art of Japanese Patent Publication No. 2006-123118A, it is possible to prevent the brake from becoming unable to be locked due to a single fault of the switching control means and possible to improve the safety when controlling drive of a brake.

However, the brake circuit is tested for malfunction by the brake drive control circuit 10 which is disclosed in Japanese Patent Publication No. 2006-123118A only one time during the test period right before the brake is disengaged as shown in FIG. 1B. The brake circuit cannot be tested during the subsequent operation. For this reason, to again test the brake circuit, it is necessary to stop the operation of the robot and turn off the power from the brake drive control circuit 10. If not testing the brake for a long period of time, there is a possibility that a single fault will become a double fault and there is the danger that the brake will no longer operate normally. When a high reliability of the brake drive control circuit 10 is demanded or when continuous operation of the robot over a long period is necessary, it is necessary to test the brake drive control circuit 10 during robot operation, but there was the problem that this was not possible with the brake drive control circuit 10 which is disclosed in Japanese Patent Publication No. 2006-123118A.

SUMMARY OF INVENTION

In one aspect, the present invention has as its object the provision of a brake drive control circuit which enables testing of the brake drive control circuit during robot operation when a high reliability is demanded from the brake drive control circuit or when continuous operation of the robot over a long period of time is required.

According to one aspect of the present invention, there is provided a brake drive control circuit which has a plurality of semiconductor circuits which can turn on/off drive signals to a brake which is provided at a servo motor, wherein the semiconductor circuits are connected in series with the brake, a plurality of control devices which generate brake signals which can independently turn on/off the semiconductor circuits are provided respectively connected to the plurality of the semiconductor circuits, a voltage detection circuit which detects the presence of voltage which is applied to the brake is provided connected in parallel to the brake, the plurality of the control devices are respectively provided with test pulse generating functions which introduce test pulses which instantaneously turn off the semiconductor circuits into the brake signals, the control devices transmit the brake signals which turn all of the semiconductor circuits off when engaging the brake to the semiconductor circuits and transmit the brake signals which turn all of the semiconductor circuits on when disengaging the brake to the semiconductor circuits, the plurality of the test pulse generating functions introducing the test pulses in the brake signals while giving time differences when disengaging the brake, and the voltage detection circuit detecting any malfunction of the semiconductor circuits by detecting the test pulses when disengaging the brake.

BRIEF DESCRIPTION OF THE DRAWINGS

The present invention will be understood more clearly by referring to the drawings attached below.

FIG. 8 is a time chart which adds control content to a waveform diagram of the brake signal, the detection signal, the state of the brake, and the monitor signal in the brake drive control circuit which is shown in FIG. 4.

FIG. 11 is a time chart which shows trends in the test pulse, monitor signal, PWM signal, and effective voltage in the brake drive control circuit which is shown in FIG. 10.

DETAILED DESCRIPTION

Figure 1A:
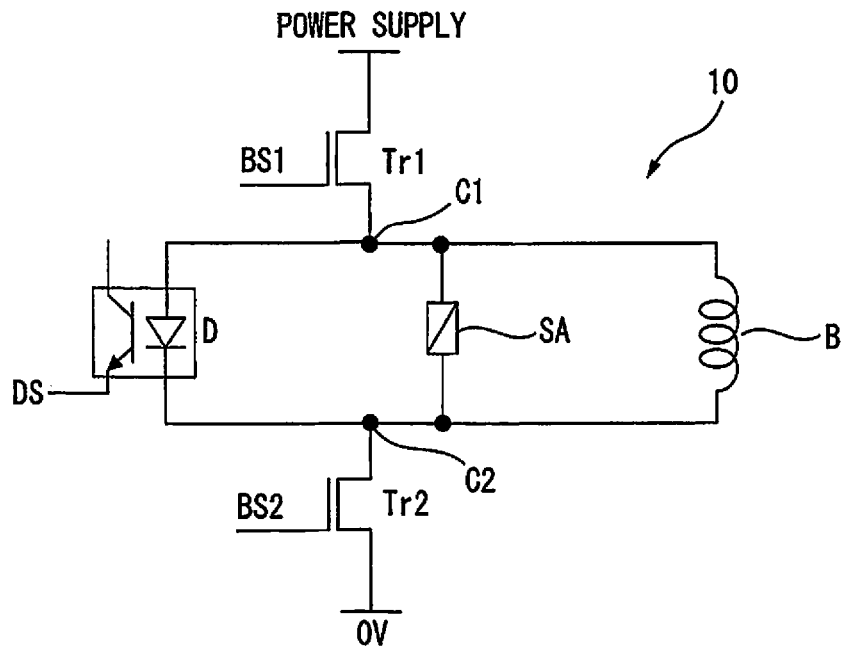
FIG. 1A is a circuit diagram of a brake drive control circuit which is disclosed in Japanese Patent Publication No. 2006-123118A.
Figure 1B:
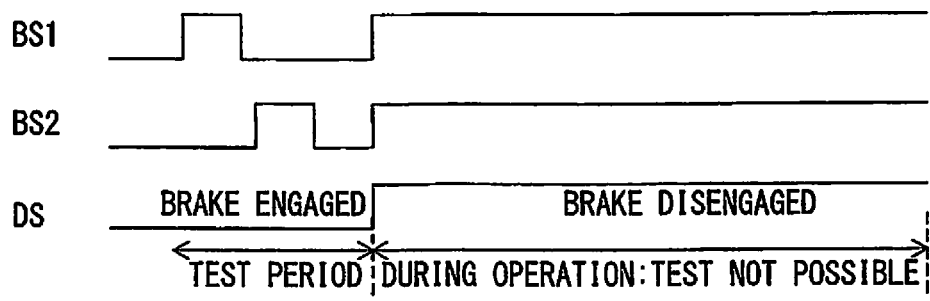
FIG. 1B is a waveform diagram of a normal period brake signal and detection signal in the brake drive control circuit which is shown in FIG. 1A.
Figure 1C:
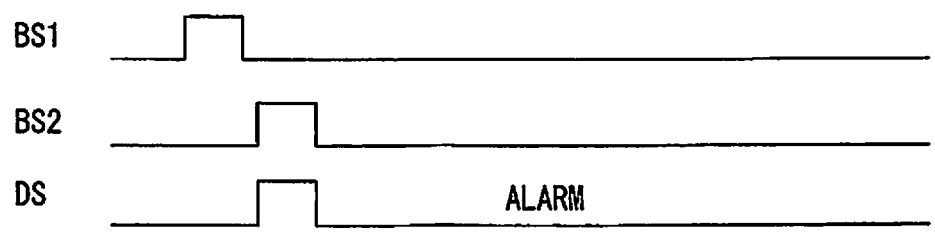
FIG. 1C is a waveform diagram of an abnormal period brake signal and detection signal in the brake drive control circuit which is shown in FIG. 1A.

Below, the attached drawings will be used to explain in detail embodiments of the present invention based on specific examples. Note that component members the same as a brake drive control circuit 10 which is disclosed in Japanese Patent Publication No. 2006-123118A which was explained in FIG. 1A will be assigned the same reference notations in the explanation.

Figure 2:
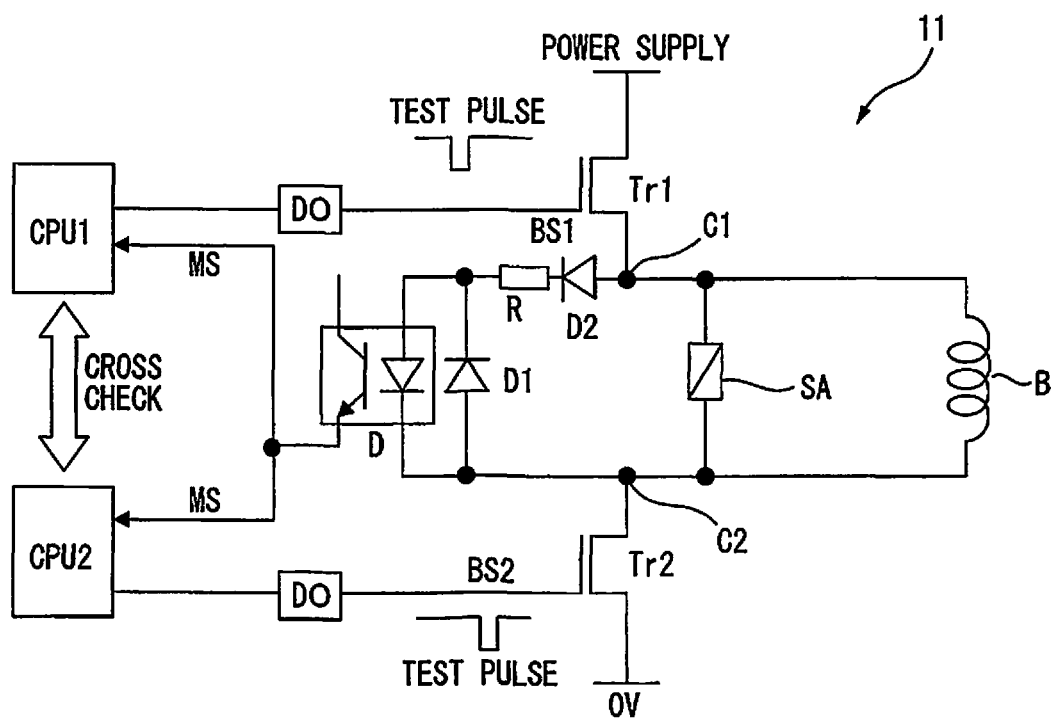
FIG. 2 is a circuit diagram of a brake drive control circuit according to a first embodiment.

FIG. 2 is a circuit diagram of a brake drive control circuit 11 according to a first embodiment of the present invention. The brake drive control circuit 11 of the first embodiment is provided with two semiconductor switching devices Tr1 and Tr2, surge absorber SA, brake B, detection circuit D, two diodes D1, D2, a resistor R, two digital outputs DO, and two control devices CPU1 and CPU2. The brake B and the surge absorber SA are connected in parallel, a terminal C1 at a power supply side is connected to a source of the semiconductor switching device Tr1, and a terminal C2 of a ground side is connected to a drain of the semiconductor switching circuit Tr2. Further, the detection circuit D has a diode D1 connected to it in parallel. The resistor R and the diode D2 are connected in series, the other end of the resistor R is connected to the detection circuit D, and an anode of the diode D2 is connected to the source of the semiconductor switching device Tr1. The semiconductor switching devices Tr1 and Tr2 are turned on when the brake signals BS1 and BS2 are input to the gates.

The control device CPU1 outputs a brake signal BS1 from it. This brake signal BS1 is input through the digital output DO to the gate of the semiconductor switching device Tr1. Similarly, the control device CPU2 also outputs a brake signal BS2 from it. This brake signal BS2 is input through the digital output DO to the gate of the semiconductor switching device Tr2. The detection circuit D is for example comprised of a photocoupler. It outputs a monitor signal MS when voltage is applied to the brake B. The signal MS which is output from the detector D is input to the control device CPU1 and the control device CPU2, whereby the control device CPU1 and the control device CPU2 can run cross checks. Note that the function of the digital output DO can be included in the control device CPU1 and the control device CPU2.

Figure 3A:
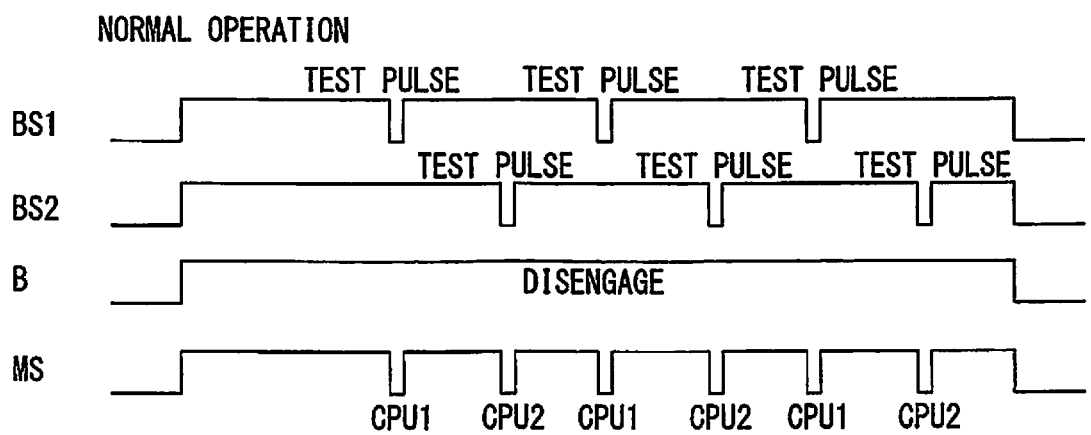
FIG. 3A is a waveform diagram of a normal period brake signal, detection signal, and monitor signal in the brake drive control circuit which is shown in FIG. 2.

FIG. 3A is a waveform diagram of the normal period brake signals BS1 and BS2 and monitor signal MS in the brake drive control circuit 11 which is shown in FIG. 2. In the brake drive control circuit 11 of the first embodiment, while the brake is disengaged, during which the control devices CPU1 and CPU2 output high level signals, extremely short low level signals (hereinafter referred to as "test pulses") are alternately output from the digital output DO. If the test pulses are input to the semiconductor switching devices Tr1 and Tr2, the semiconductor switching devices Tr1 and Tr2 turn off for extremely short time periods.

When the semiconductor switching devices Tr1 and Tr2 are both normal, if the semiconductor switching devices Tr1 and Tr2 are turned off for an extremely short time, low level signals corresponding to the test pulses appear in the monitor signal MS which is output from the detection circuit D. According, by confirming the off states of the semiconductor switching devices Tr1 and Tr2 by the monitor signal MS, it becomes possible to confirm that the semiconductor switching devices Tr1 and Tr2 have not malfunctioned due to short-circuiting.

In this case, compared with the time for the disengagement of the brake (about several tens of ms), the test pulses are low level signals of an extremely short time (1 ms or less), so these test pulses have no effect on the disengagement of the brake even if turning the semiconductor switching devices off. Accordingly, there is no effect on the disengagement of the brake and the semiconductor switching devices can be tested for normality/abnormality. Furthermore, the brake drive control circuit 11 is driven and the semiconductor switching devices are tested for normality/abnormality by two independent control devices CPU1, CPU2, so the reliability of the brake drive control circuit 11 can be raised.

Figure 3B:
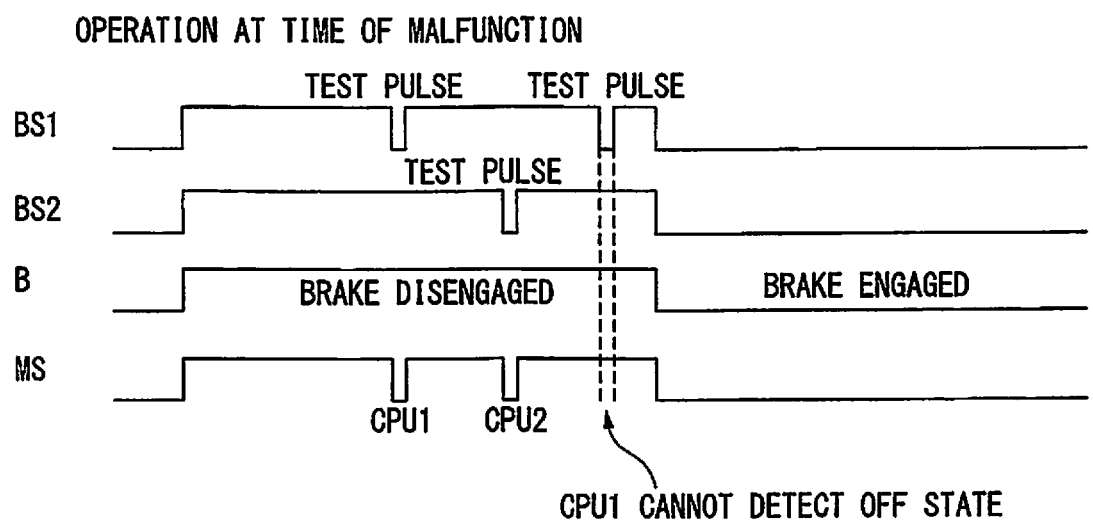
FIG. 3B is a waveform diagram of an abnormal period brake signal, detection signal, and monitor signal in the brake drive control circuit which is shown in FIG. 2.

Here, using the time chart which is shown in FIG. 3B, the case where first the semiconductor switching devices Tr1 and Tr2 are both normal, but the semiconductor switching device Tr1 malfunctions by short-circuiting at a certain point of time during brake disengagement will be explained. When the semiconductor switching devices Tr1 and Tr2 are both normal, as explained above, if the semiconductor switching devices Tr1 and Tr2 turn off for extremely short time periods, low level signals corresponding to the test pulses appear in the monitor signal MS which is output from the detection circuit D.

On the other hand, for example, if the semiconductor switching device Tr1 malfunctions by short-circuiting at a certain point of time during brake disengagement, even if test pulses are input to the semiconductor switching device Tr1, the semiconductor switching device Tr1 will not turn off. As a result, low level signals corresponding to the test pulses which are output from the control device CPU1 will not appear in the monitor signal MS which is output from the detection circuit D. Accordingly, it is not possible to confirm the off state of the semiconductor switching device Tr1 by the monitor signal MS, so it becomes possible to confirm the semiconductor switching device Tr1 is malfunctioning by short-circuiting.

Note that, in the brake drive control circuit 11 according to the first embodiment which is shown in FIG. 2, at the time of testing, if the semiconductor switching devices Tr1 and Tr2 turn off, a surge voltage is generated from the brake B, but the generated surge voltage is absorbed by the surge absorber SA. In the case of a robot, a six-axis one is general. The surge energy of the six brakes is absorbed by the surge absorber SA.

Figure 4:
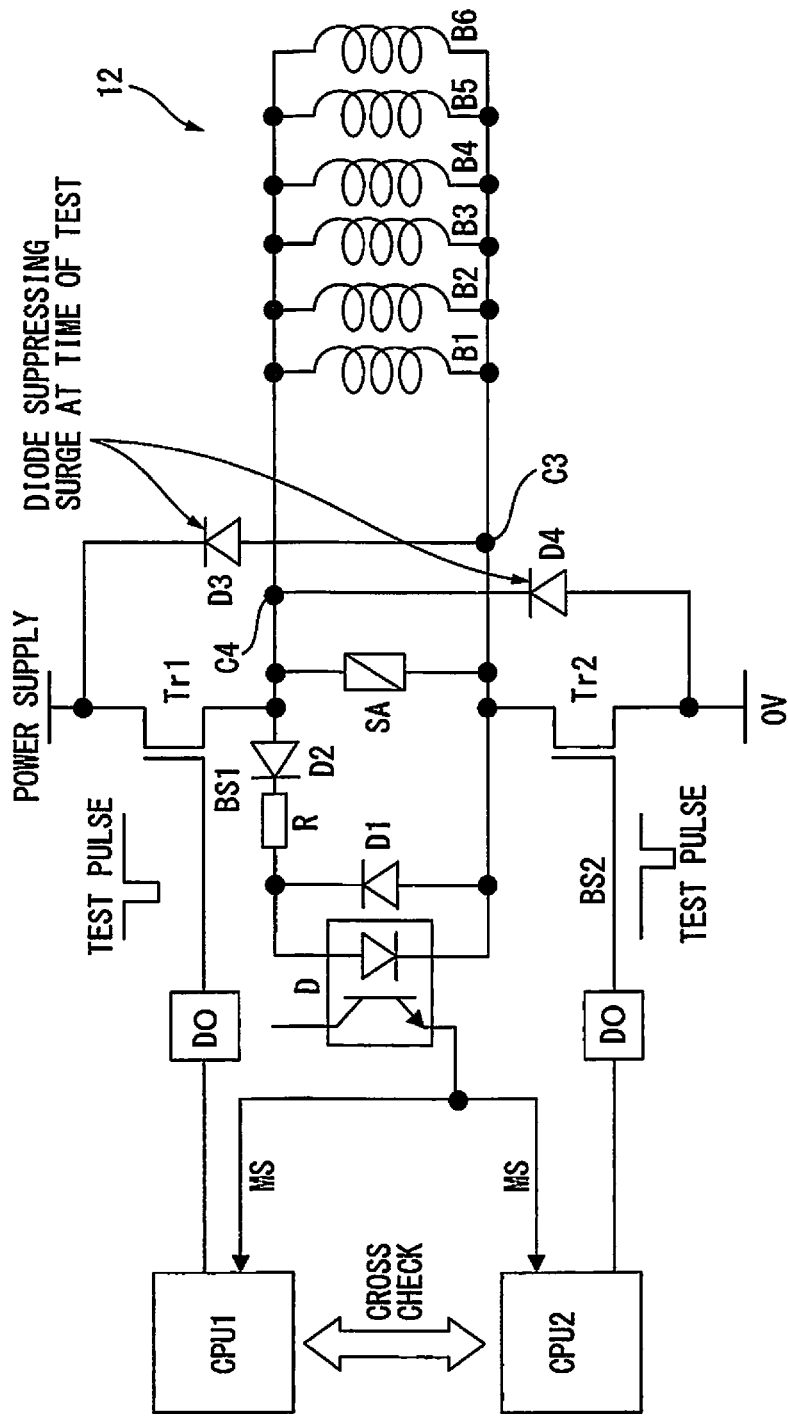
FIG. 4 is a circuit diagram of a brake drive control circuit according to a second embodiment.

FIG. 4 is a circuit diagram of a brake drive control circuit 12 according to a second embodiment of the present invention. The brake drive control circuit 12 of the second embodiment is applied to a six-axis robot. Six brakes B1 to B6 are provided. Further, the basic configuration of the brake drive control circuit 12 according to the second embodiment is the same as the configuration of the brake drive control circuit 11 according to the first embodiment of the present invention which is shown in FIG. 2, so the same component members are assigned the same reference notations and explanations will be omitted.

The point of difference of the brake drive control circuit 12 according to the second embodiment from the brake drive control circuit 11 according to the first embodiment is the point that the connecting point C3 at the ground side of the six brakes B1 to B6 is connected by the diode D3 to the power supply and the connecting point C4 at the power supply side is connected by the diode D4 to the ground. The diode D3 is connected at the anode to the connecting point C3 at the ground side of the six brakes B1 to B6 and is connected at the cathode to the power supply. The diode D4 is connected at the cathode to the connecting point C4 at the power supply side of the six brakes B1 to B6, while it is connected at the anode to the ground.

Figure 5:
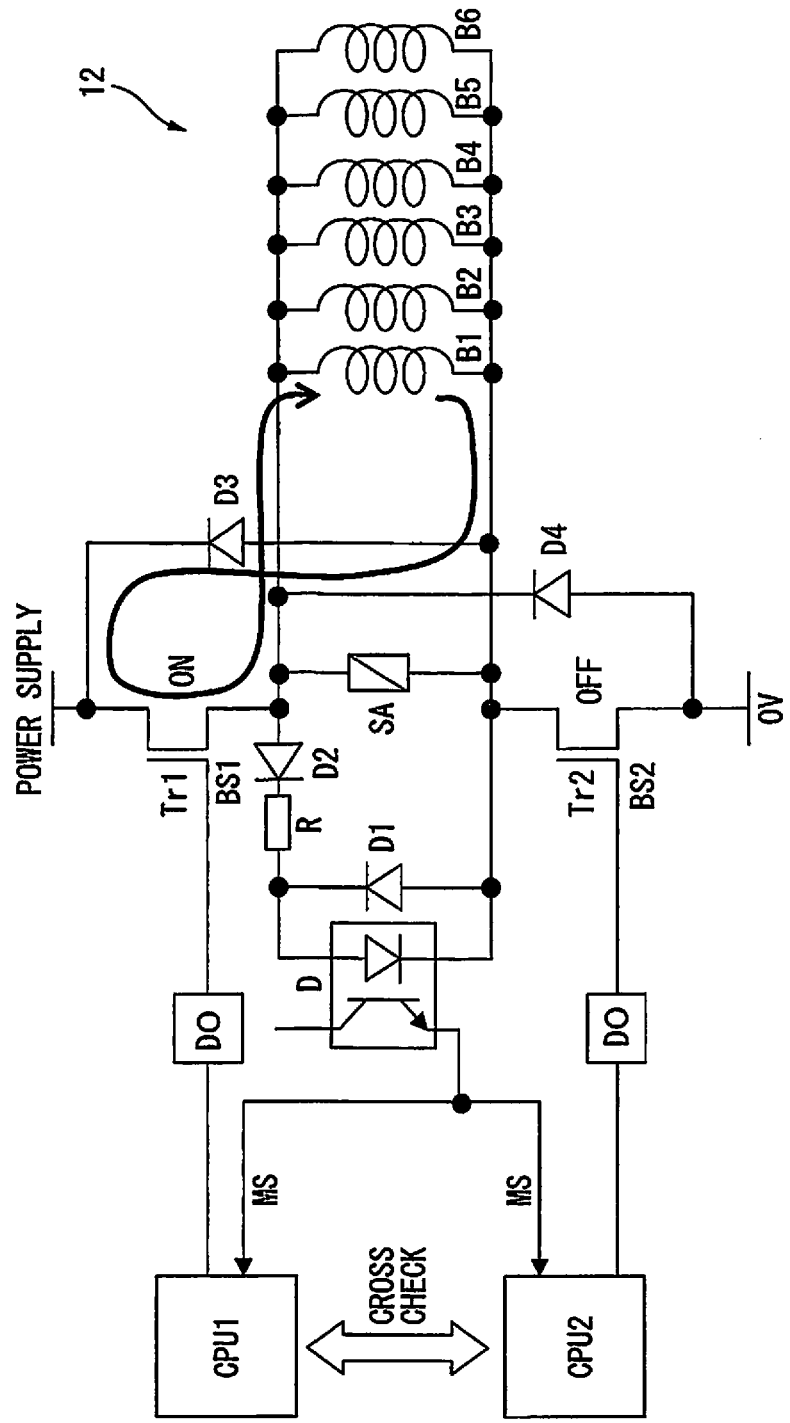
FIG. 5 is a circuit diagram which shows the flow of current at the time of testing of a brake drive control circuit which is shown in FIG. 4.
Figure 6:
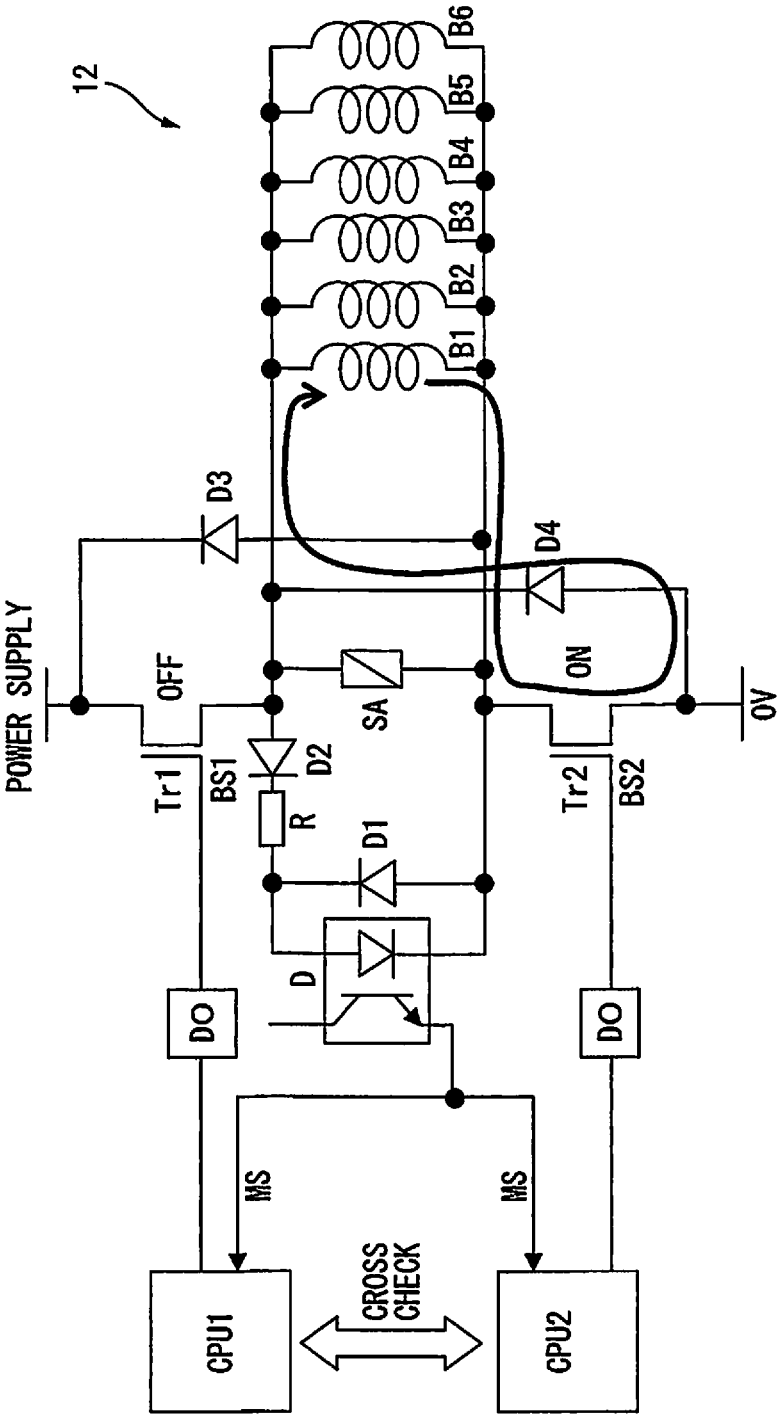
FIG. 6 is a circuit diagram which shows the flow of current at the time of testing of a brake drive control circuit which is shown in FIG. 4.
Figure 7:
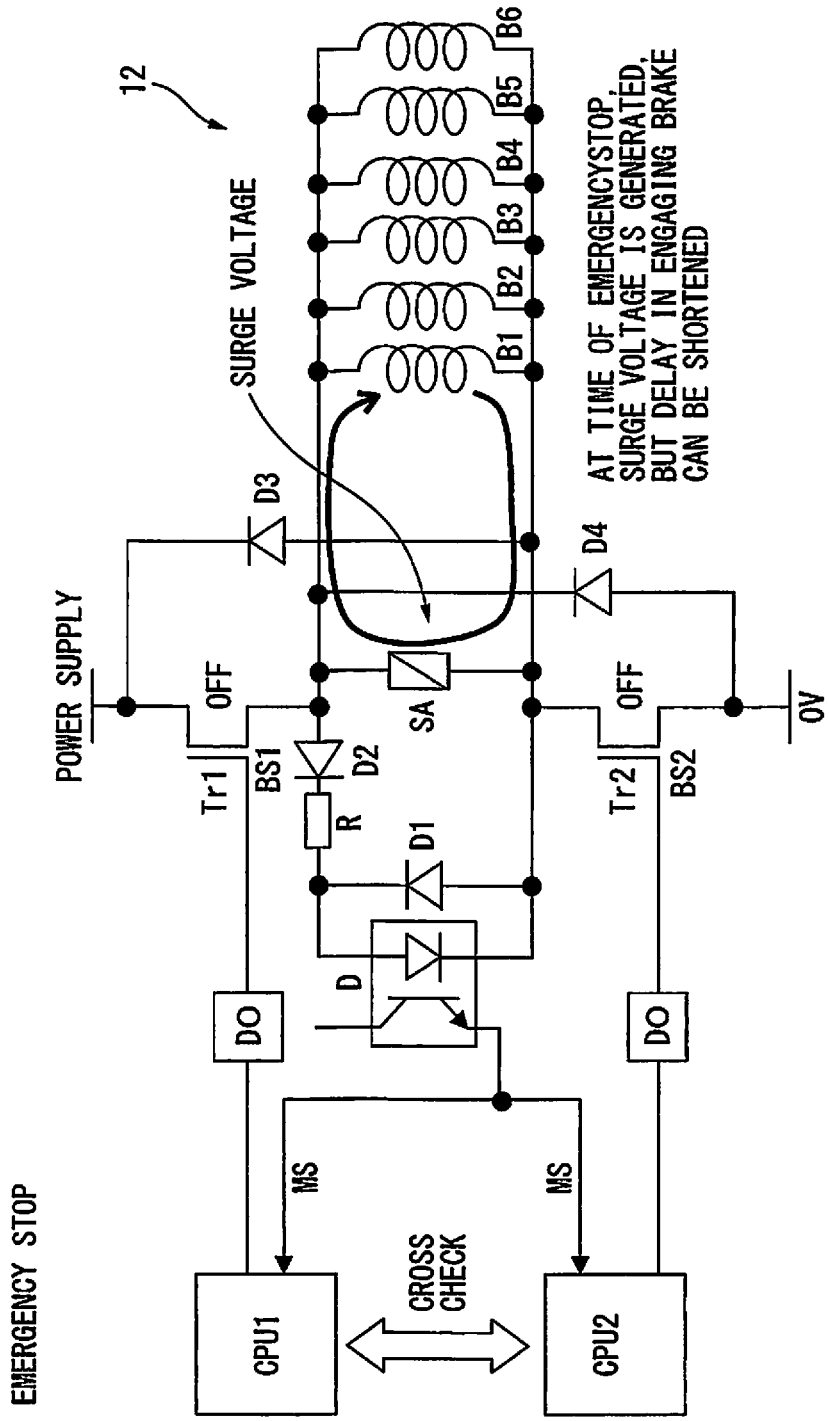
FIG. 7 is a circuit diagram which shows the flow of current at the time of emergency stop of a brake drive control circuit which is shown in FIG. 4.

Here, FIG. 5 to FIG. 7 will be used to explain the operation of the brake drive control circuit 12 of the second embodiment which is shown in FIG. 4. FIG. 5 shows the operation of the brake drive control circuit 12 when turning on the semiconductor switching device Tr1 and turning off the semiconductor switching device Tr2 (test period 1). At the time of the test, when the semiconductor switching device Tr1 is on and in that state the semiconductor switching device Tr2 is turned off by a test pulse, current flows through the diode D3 as shown by the arrow mark, so the surge voltage can be eliminated.

FIG. 6 shows the operation of the brake drive control circuit 12 in the case where the semiconductor switching devices Tr1 is turned off and the semiconductor switching device Tr2 is turned on (test period 2). At the time of the test, when the semiconductor switching device Tr2 is on and in that state the semiconductor switching device Tr1 is turned off by a test pulse, current flows through the diode D4 as shown by the arrow mark, so the surge voltage can be eliminated.

FIG. 7 shows the operation of the brake drive control circuit 12 in the case of the time of an emergency stop where the semiconductor switching devices Tr1 and Tr2 are both turned off. The voltage which is generated at the brakes B1 to B6, as shown by the arrow mark, is absorbed by the surge absorber SA, so it is possible to shorten the delay when engaging the brakes B1 to B6 and possible to disengage the brakes B1 to B6 in a short time.

Note that in the brake drive control circuit 12 of the second embodiment, when detecting malfunction of the brake drive control circuit 12, one of the semiconductor switching devices is used to engage the brakes, so the brake response becomes slower, but the time of the position holding control is extended, so it becomes possible to keep the arm of the robot from dropping. This position holding control will be explained using FIG. 8.

FIG. 8 shows a time chart which shows the relationship between the control of a motor and a brake using the brake drive control circuit 12 of the second embodiment. The position holding control of the motor is started, then the brake disengagement command is issued. Due to this, even if an abnormality occurs in the brake drive control circuit 12, the arm will never drop. After the brake being disengaged and the brake drive control circuit 12 being free of abnormality being confirmed by two independent control devices CPU1 and CPU2, the operation of the robot is started. Even during operation of the robot, the brake is periodically tested. When an abnormality is detected in the brake drive control circuit 12, position holding control is performed, the brake is reliably engaged, then the position holding control is stopped and an alarm stop state is entered.

Figure 9A:
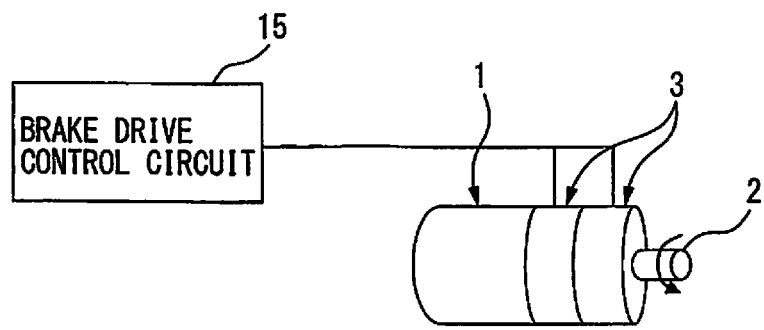
FIG. 9A is a view which applies the brake drive control circuit of the present invention to one example of a mechanism having double brakes.
Figure 9B:
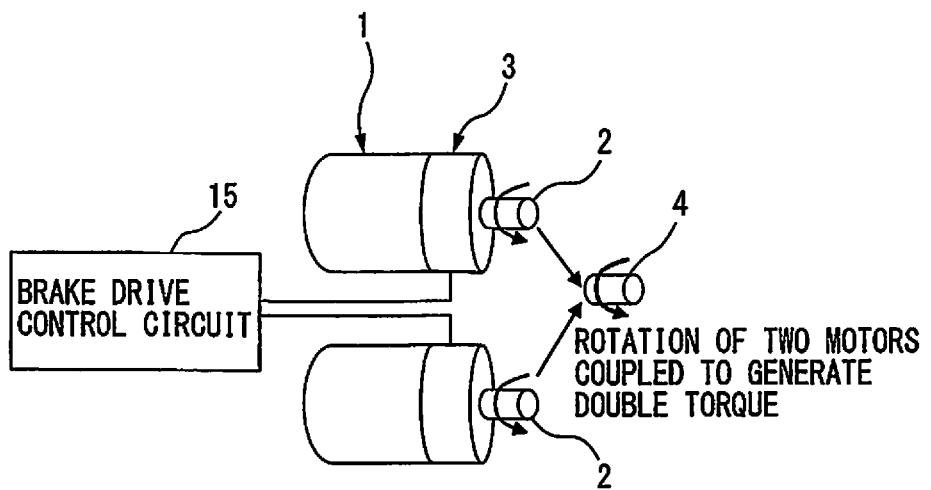
FIG. 9B is a view which applies the brake drive control circuit of the present invention to another example of a mechanism having double brakes.

FIG. 9A and FIG. 9B show embodiments which apply a brake drive control circuit 15 to mechanisms having double brakes. In the embodiment which is shown in FIG. 9A, two brakes 3 which are connected to the brake drive control circuit 15 are attached to sides of a motor body 1 from which the shaft 2 sticks out. Further, in the embodiment which is shown in FIG. 9B, there are two motor bodies 1. Two brakes 3 which are both connected to the brake drive control circuit 15 are respectively attached to sides of the motor bodies 1 from which shafts 2 stick out. The shafts 2 which stick out from the two motor bodies 1 are connected and form a drive shaft 4 which generates a double torque.

In the case of these embodiments, the brake drive control circuit 15, whose circuit configurations are not illustrated, are constantly being tested. Further, when double brake drive control circuits 15 are provided, it becomes possible to improve the safety of the brakes.

Figure 10:
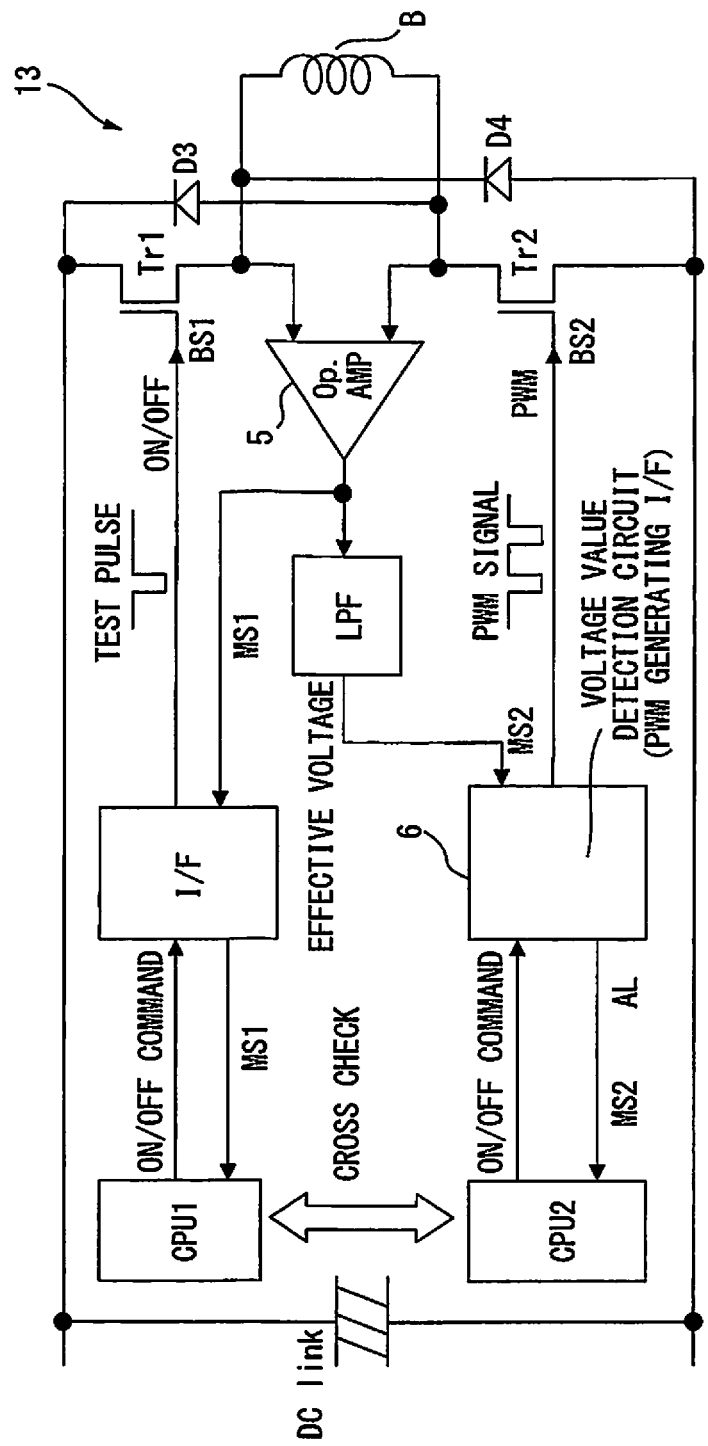
FIG. 10 is a circuit diagram of a brake drive control circuit according to a third embodiment.

FIG. 10 shows a brake drive control circuit 13 of a third embodiment of the present invention. This is a brake drive control circuit 13 which is built in a servo amplifier. In the third embodiment, as the power supply, a DC power supply (DC link) of an inverse transform circuit of the servo amplifier is used. This power supply is higher than the rated voltage of the brake, so pulse width modulation (PWM) control can be used to convert the voltage to a suitable effective voltage. In the brake drive control circuit 13 of the third embodiment, the voltage detection circuit 5 is comprised of an analog circuit (for example, operating amplifier) . The monitor signal MS1 which is output from the voltage detection circuit 5 is passed through the low pass filter LPF and converted to effective voltage which is used as a feedback signal (effective voltage applied to brake coil) MS2 of the PWM control.

The semiconductor switching device which performs PWM control may be the same as the second semiconductor switching device Tr2 of the brake drive control circuit 12 which is shown in FIG. 4. The second semiconductor switching device Tr2 is controlled by the PWM signal which is generated by PWM generating I/F circuit. The PWM signal turns on/off periodically, so the second semiconductor switching device Tr2 does not require input of a test pulse.

Even if the semiconductor switching device Tr2 for PWM control short-circuits and malfunctions, since the semiconductor switching device Tr2 is constantly on, the feedback signal MS2 becomes an abnormally high voltage and is detected as an abnormality of the brake drive control circuit 13 by a voltage value detection circuit 6. When an abnormality of the brake drive control circuit 13 is detected by the voltage value detection circuit 6, an alarm signal AL is input from the voltage value detection circuit 6 to the control device CPU 2. That is, in the brake drive control circuit 13 of the third embodiment, the effective voltage which is output from OP. AMP (Operational Amplifier) circuit 5 is constantly monitored, so a test by a test pulse need only be performed by the first semiconductor switching device Tr1. In the brake drive control circuit 13 of the third embodiment, the test pulse which is input to the first semiconductor switching device Tr1 is generated at the interface circuit I/F.

Further, as shown in FIG. 11, if the test pulse is given to the first semiconductor switching device Tr1 in the time period when the second semiconductor switching device Tr2 for PWM control turns on, a check similar to the brake drive control circuit 12 of the second embodiment becomes possible.

Further, at the time of an emergency stop, by turning off the first semiconductor switching device Tr1 and the second semiconductor switching device Tr2 for PWM control, a similar operation as the brake drive control circuit 12 of the second embodiment can be realized. In the brake drive control circuit 13 of the third embodiment which is shown in FIG. 10, no surge absorber is described. This is because the surge voltage of the brake B is returned to the DC link circuit of the servo amplifier and this DC link circuit is equipped with an extremely large capacitor, so no surge absorber is necessary.

As explained above, according to the present invention, periodic testing of brake drive control circuits during operation becomes possible. Compared with the prior art, where only checks before operation are possible, the safety of the brake drive control circuits is improved.

Note that, a brake circuit mainly includes an inductance component, so that a surge voltage is generated each time closing the brake circuit. If eliminating the surge voltage by circuit design, the brake response becomes slower. For this reason, at the time of periodically repeated testing, the surge voltage is suppressed, while at the time of emergency stop, surge voltage is generated to shorten the brake operating time. Even if an abnormality is detected in the brake drive control circuit, the brake disengagement current is cut by just the normal side semiconductor switching device of the brake drive control circuit. In this case, in the same way as the time of testing, the brake response becomes slower, but it is possible to avoid the arm dropping by joint use of the above-mentioned position holding control.

According to the brake drive control circuit of the present invention, there is the effect that it becomes possible to test a brake drive control circuit during robot operation.

Above, the present invention was explained with reference to preferred embodiments, but a person skilled in the art would understand that various modifications and changes can be made without departing from the scope of the later explained claims.

What is claimed is:

1. A brake drive control circuit comprising:
semiconductor circuits configured to turn on/off drive signals to a brake which is provided at a servo motor, said semiconductor circuits connected in series with said brake;
control devices configured to generate brake signals to independently turn on/off said semiconductor circuits, said control devices respectively connected to said semiconductor circuits; and
a voltage detection circuit configured to detect a presence of a voltage applied to said brake, said voltage detection circuit connected in parallel to said brake, wherein
said control devices are respectively provided with test pulse generating circuits configured to introduce test pulses into said brake signals, said test pulses configured to instantaneously turn off said semiconductor circuits,
said control devices are configured to
transmit, to said semiconductor circuits, said brake signals which turn all of said semiconductor circuits off when engaging said brake, and
transmit, to said semiconductor circuits, said brake signals which turn all of said semiconductor circuits on when disengaging said brake,
said test pulse generating circuits are configured to introduce said test pulses into said brake signals when disengaging said brake,
said test pulses have no effect regarding a release of the brake, and
said voltage detection circuit is configured to detect a malfunction of said semiconductor circuits by detecting an absence of a test pulse among said test pulses when disengaging said brake.

2. The brake drive control circuit according to claim 1, wherein
said control devices are multiplexed control devices which have cross check functions,
said voltage detection circuit is connected together with said multiplexed control devices, and
each of said control devices is configured to confirm a detection of a malfunction of said semiconductor circuits by said voltage detection circuit.

3. The brake drive control circuit according to claim 1, further comprising:
diodes between said brake and a power supply of said semiconductor circuits; and
a surge absorber connected in parallel with said brake, wherein
said diodes are configured to absorb surge voltage from said brake during disengagement of said brake in a state where one of said brake signals is off and the other of said brake signals is on, and
said surge absorber is configured to absorb said surge voltage from said brake so that said surge voltage of said brake does not flow to said diodes when said brake signals are all off during said brake disengagement.

4. The brake drive control circuit according to claim 1, wherein the brake drive control circuit is configured to:
set a command for holding a position of said servo motor as valid before a brake disengagement operation, and
when a malfunction of said brake drive control circuit is detected,
turn off said semiconductor circuits and continue to issue the command for holding the position of said servo motor, and
after said brake is engaged, stop the command for holding the position of said servo motor.

5. A combination, comprising:
at least one servo motor;
two brakes provided for said at least one servo motor; and
a brake drive control circuit, wherein said two brakes are connected to said brake drive control circuit,
said brake drive control circuit, comprising:
semiconductor circuits configured to turn on/off drive signals to said brakes, said semiconductor circuits connected in series with said brakes;
control devices configured to generate brake signals to independently turn on/off said semiconductor circuits, said control devices respectively connected to said semiconductor circuits; and
a voltage detection circuit configured to detect a presence of a voltage applied to said brakes, said voltage detection circuit connected in parallel to said brakes, wherein
said control devices are respectively provided with test pulse generating circuits configured to introduce test pulses into said brake signals, said test pulses configured to instantaneously turn off said semiconductor circuits,
said control devices are configured to
transmit, to said semiconductor circuits, said brake signals which turn all of said semiconductor circuits off when engaging said brakes, and
transmit, to said semiconductor circuits, said brake signals which turn all of said semiconductor circuits on when disengaging said brakes,
said test pulse generating circuits are configured to introduce said test pulses into said brake signals when disengaging said brakes,
said test pulses have no effect regarding a release of the brakes, and
said voltage detection circuit is configured to detect a malfunction of said semiconductor circuits by detecting an absence of a test pulse among said test pulses when disengaging said brakes.

6. The combination according to claim 5, wherein
said at least one servo motor includes two servo motors,
said two brakes are provided for said two servo motors, respectively, and
two shafts of said servo motors are mechanically coupled with a single drive shaft for generation of a single direction torque.

7. The brake drive control circuit according to claim 1, wherein
one of said test pulse generating circuits is a circuit configured to convert the corresponding brake signal to a signal which is periodically repeatedly turned on and off,
the semiconductor circuit corresponding to said one test pulse generating circuit is an on/off control circuit configured to periodically repeatedly turn on and off so as to control an effective voltage applied to said brake,
said brake drive control circuit further comprises:
an effective voltage conversion circuit configured to convert an output from said voltage detection circuit to a feedback signal; and
an effective voltage value detection circuit connected to said effective voltage conversion circuit and configured to detect a value of said feedback signal, and
said effective voltage value detection circuit is configured to detect, when the brake is disengaged, a malfunction of said on/off control circuit based on the value of said feedback signal.

\* \* \* \* \*